W. B. FENN.
CORN CUTTING MACHINE.
APPLICATION FILED DEC. 26, 1914.
1,282,789.
Patented Oct. 29, 1918.
2 SHEETS—SHEET 1.
Fig. 1.
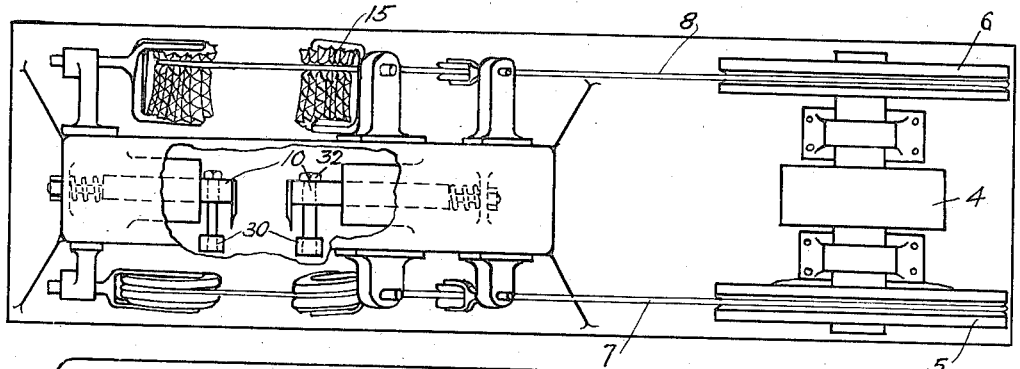
Fig. 2.
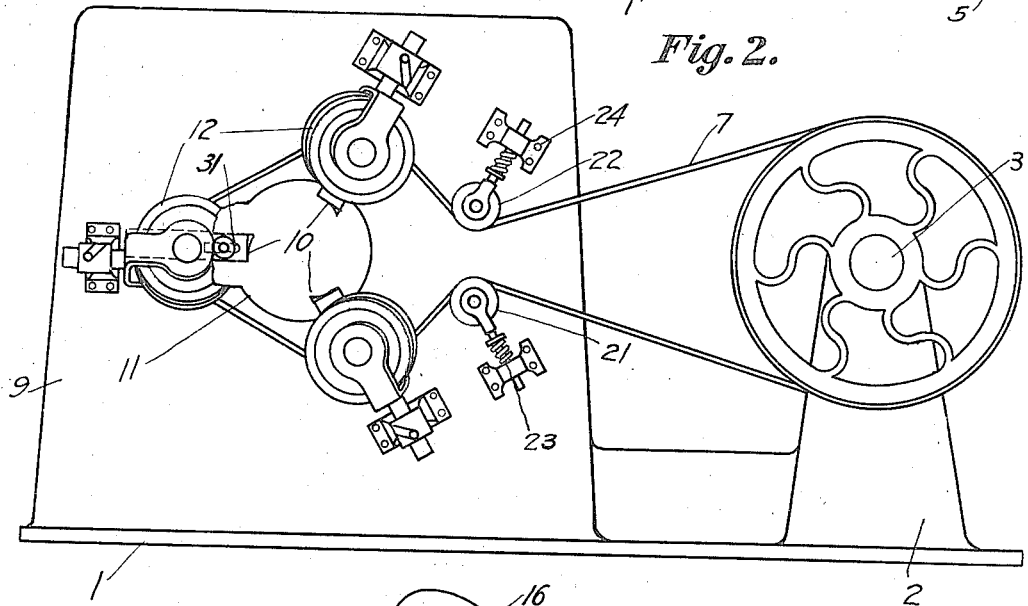
Fig. 3.
WITNESSES:
Frederick W. Ives.
James H. Platt.
WILLIAM B. FENN, INVENTOR.
BY
Edwin P. Corbe
ATTORNEY.

UNITED STATES PATENT OFFICE.

WILLIAM B. FENN, OF COLUMBUS, OHIO, ASSIGNOR TO WEDOIT COMPANY, OF COLUMBUS, OHIO, A CORPORATION OF OHIO.

CORN-CUTTING MACHINE.

1,282,789.   Specification of Letters Patent.   Patented Oct. 29, 1918.

Application filed December 26, 1914. Serial No. 879,069.

*To all whom it may concern:*

Be it known that I, WILLIAM B. FENN, a citizen of the United States of America, residing at Columbus, in the county of Franklin and State of Ohio, have invented certain new and useful Improvements in Corn-Cutting Machines, of which the following is a specification.

My invention relates to corn cutting machines and contemplates the provision of a machine having a minimum number of parts for efficiently feeding the ears of corn, removing the kernels with a cut of any desired depth, and then digging out the chits of the kernels from the cob without retarding the passage of the ears of corn through the machine.

One of the important features of my improvement relates to the feeding mechanism which is of a novel and simple form. It is based upon the use of a skewed roller which contacts with the ear and by its rotation both rotates the ear and feeds it longitudinally. In the form which I shall describe, there are used three rollers to a set but it is apparent that many variations of the principle may be had.

In the cutting of corn from the cob by a spiral cutting action, certain peculiar conditions arise. For instance, an obvious way to do this is to rotate each ear and at the same time longitudinally feed it to and through concentrically disposed cutting knives. Now, the relative rotation between the ears and the knives and the longitudinal feed of the ears must have a definite relation to each other in an ideal machine. For example, if the longitudinal feed is too rapid in relation to rotation, all the kernels will not be severed; or if the rotation is too rapid in relation to the longitudinal feed, some portions of the ears will be covered more than once by the knives.

Another feature, which is closely related to these conditions, results from the fact that the ears are constantly varying in size. Therefore, if the speed of rotation is maintained throughout, the rate of cutting will be more rapid in operating upon a large ear than upon a small ear; for the knives completely rotate about a large ear in the same length of time in which they rotate about a small ear. In other words, with a large ear, each kernel will be severed more rapidly than with a small ear.

With these facts in mind, it will be obvious that an ideal corn cutting machine should have a constant rate of cutting, that is, each kernel should be severed in about the same time, regardless of the size of the ear being operated upon.

This machine maintains a constant rate of cutting. As the ears increase in size, the skewed rollers oscillate so as to decrease the relative speed of rotation between the ear and the knives, which maintains the rate of cutting constant. At the same time that the speed of rotation has decreased, the speed of longitudinal feed has also decreased, so that such speed will be so slowed that all of the kernels will be severed and no part of the ear covered more than once by the knives. Thus, the rate of cutting is automatically maintained and both the rotation and the longitudinal feed are so varied that they retain their proper relation to each other. It will be obvious that, in passing from a large to a small ear, the reverse occurs.

In conjunction with the feeding rollers, I desirably use a driving belt or chain which is tensioned and so disposed as to normally maintain the feeding roll or rollers in contact with the ears of corn. This will appear from the preferred form to be illustrated in the drawings.

Another novel feature of my improvement relates to a means on the cutting knives for regulating the depth of the cut so that the machine may produce "cream" corn. This is commonly effected by cutting off the heads of the kernels and then mashing out the chits. Or my machine may entirely remove the kernels, making a cut practically free from the mashing action. This device is particularly effective in conjunction with digging rollers that I utilize for grasping and feeding the ears as they leave the knives.

The preferred forms of my invention are shown in the accompanying drawings in which—

Figure 1 is a plan view of my improvement, partially broken away.

Fig. 2 is a side elevation of the structure shown in Fig. 1.

Fig. 3 is a detail in elevation showing one of the feeding rolls and the preferred manner of mounting thereof.

Figure 4:
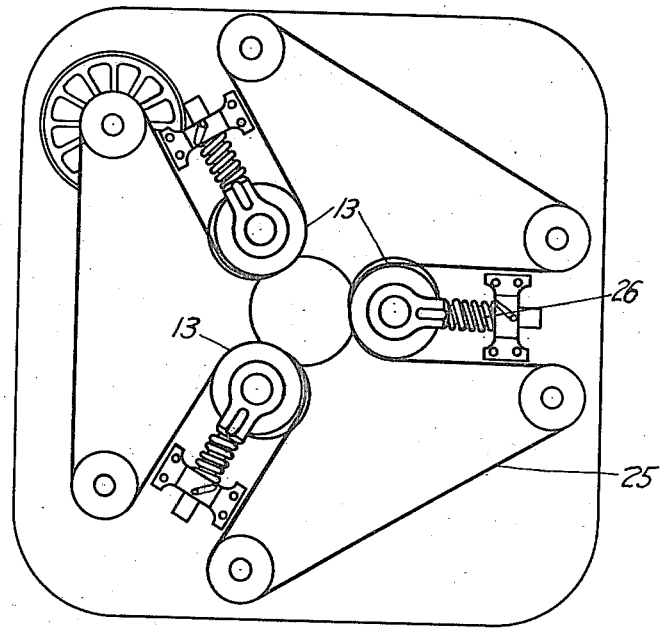
Fig. 4 is a side elevation illustrating a modification of my improvement.

In the drawings, and referring to Figs. 1, 2 and 3, my machine comprises a base 1 having a standard 2 on which is mounted a driving shaft 3 carrying a driving pulley 4. On the opposite ends of this driving shaft 3 are belt wheels 5 and 6 carrying belts 7 and 8.

At the opposite end of the base 1 is an upstanding portion 9 containing the interior mechanism of my machine, shown as housing radial knives 10 preferably yieldably mounted to conform to the diameter of the corn cob as it passes through the machine. By reference to Fig. 2 it will be noted that these knives 10 extend into an opening 11 in such casing 9 and it will be understood that the ear of corn is received by rolls 12 and fed into such opening in its delivery to the cutting knives.

Reference to Figs. 1 and 2 will disclose knife attachments in the form of gaging rolls 30 which are adjustable in slots 31 and which are designed to bear against the external surfaces of the uncut kernels of corn as they approach the cutting knives. Thus, the depth of the cut may be regulated by placing these rolls in a predetermined position, it being apparent that locking means 32 may serve to maintain the adjusted position of these rolls. Thus, if it is desired to produce "cream" corn, the rolls 30 may be set so that the tops of the kernels are cut off by the knives while the chits of the kernels are dug out by the digging feeding rolls to be described.

The rolls 12 are preferably of the form shown in Fig. 3 wherein they comprise friction surfaces 13 and grooves 14 within which moves the belt 7 for effecting rotation of such rolls. These rolls are mounted with their axes at an angle to the vertical and their skewed position brings them into contact with the ears of corn at such an angle that these ears of corn are not only rotated but are fed longitudinally. The result is that each ear of corn is grasped and given a spiral movement into subjection to the cutting knives. The rollers, being provided with broad frictional surfaces firmly grip the corn and without marring the same successively pass the ears to the cutting knives.

As the ears leave the cutting knives they are gripped by the digging rolls 15 which are disposed in skewed position and which serve to rotate and feed the ears longitudinally, at the same time digging out the chits of the corn.

By reference to Fig. 3 it will be apparent that the rolls 12 and 15 are mounted in T-shaped yokes 16 having shanks 17 which are automatically adjustable rotatably by their mountings in collars 18, such automatic adjustment being limited and guided by the roller pins 19 working in cam slots 20 in these collars 18. It will be understood that this automatic adjustment serves to compensate for the constant variation of the position of the rolls in conformity with the varying diameters of the ears of corn.

The feeding rollers are constantly pressed in against the ears of corn by the operation of the driving belt 7 which encompasses the same and which is constantly tensioned by the tension rollers 21 and 22 under the control of springs 23 and 24.

The operation of this structure will be apparent. Although the feed rollers may be independently driven and independently moved inward they are shown in the present form to be driven by a single friction belt, and by such belt, to be forced continually into contact with the ears of corn regardless of the varying shapes and diameters thereof.

In the modified form of my invention shown in Fig. 4, the rolls 12 are of the same form as in the preceding figures and are driven by a belt 25. In this figure, however, the feed rolls are independently forced inward by springs 26 although it will be understood that they are skewed rolls and operate in substantially the same manner.

Figure 5:
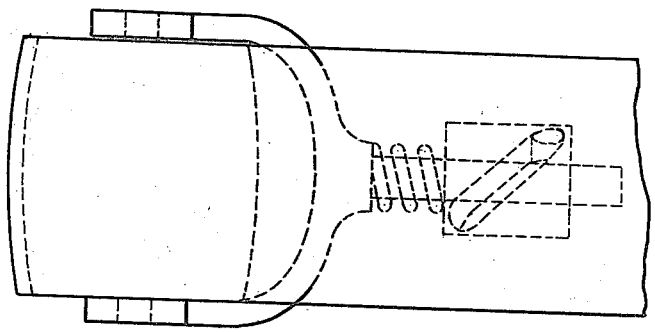
Fig. 5 is a detail in elevation showing a further modification of my improved feeding device.

The modification shown in Fig. 5 contemplates the movement of the ears of corn through the machine by contact therewith of a friction-faced belt which is disposed at an angle suitable to contact with the ears of corn and, while rotating such ears of corn, moves them horizontally and longitudinally through the machine.

It will be apparent that I have provided a machine which is simple in that a single mechanism is utilized for rotating and feeding the ears of corn longitudinally and in that the driving mechanism for such feeding devices serves to automatically maintain the feeding elements in coactive relation with the ears in passing them through the machine. In addition, I have provided a simple device for regulating the depth of the cut and this regulation means in conjunction with digging feeding rolls is peculiarly effective for the production of "cream" corn, if this seems desirable.

Having thus described my invention what I claim is:

1. In a machine for cutting green corn from the cob, means for longitudinally feeding ears of corn to relatively rotating cutting knives, and means for varying the speed of relative rotation between the knives and ears and the speed of longitudinal feed as such ears vary in diameter.

2. In a machine for cutting green corn from the cob, means for longitudinally feeding ears of corn to the relatively rotating cutting knives, and means for automatically varying the speed of relative rotation between the knives and ears and the speed of longitudinal feed as such ears vary in diameter.

3. In a machine for cutting green corn from the cob, means for longitudinally feeding ears of corn to relatively rotating cutting knives, and means for varying the speed of relative rotation between the knives and ears as such ears increase in diameter.

4. In a machine for cutting green corn from the cob, means for longitudinally feeding ears of corn to relatively rotating cutting knives, and means for automatically varying the speed of relative rotation between the knives and ears as such ears increase in diameter.

5. In a machine for cutting green corn from the cob by a spiral cutting action, means for longitudinally feeding ears of corn to relatively rotating cutting knives and means for maintaining a uniform rate of cutting as the ears of corn vary in diameter.

6. In a machine for cutting green corn from the cob by a spiral cutting action, means for longitudinally feeding ears of corn to relatively rotating cutting knives and means for controlling the rate of cutting as the ears vary in diameter.

7. In a corn cutting machine, self-adjusting feeding members having portions disposed at an angle contacting with and adapted to simultaneously propel and rotate ears of corn.

8. In a corn cutting machine, feeding elements contacting with and moving the ears longitudinally, said elements being of a character to simultaneously rotate such ears, and being adjustable to assume variant positions as the ears vary in contour.

9. In a corn cutting machine, feeding elements contacting with and moving the ears longitudinally, said elements being of a character to simultaneously rotate such ears and being automatically adjustable to assume variant positions as the ears vary in contour.

10. In a corn cutting machine, feeding rolls skewed to simultaneously rotate and feed the ears of corn by contact therewith, said rolls being so mounted as to be automatically movable to conform to the ears of corn.

11. In a corn cutting machine complemental feeding rolls with their axes in different planes, said rolls being automatically adjustable until their axes assume the proper angle.

12. In a corn cutting machine, feeding rolls, and an encompassing belt tensioned to force said rolls against the ears of corn which they feed.

13. In a corn cutting machine, skewed feeding rolls having peripheral grooves therein, said rolls being radially movable, and a tensioned driving belt embracing said rolls and fitting in their grooves, said belt maintaining said rolls in operative contact with the ears of corn.

14. In a corn cutting machine, a means for rotating and feeding ears of corn, cutting knives and gage rollers for gaging the depth of the cut of such knives.

15. In a corn cutting machine, a means for rotating and feeding the ears of corn, cutting knives, means for gaging the depth of cut of such knives, and digging feeding rollers for rotating and feeding the ears as they leave said knives.

16. In a corn cutting machine, complemental feeding rolls with their axes uniformly in different planes, and means for varying the said planes in which the axes of said feeding rolls operate.

17. In a corn cutting machine, complemental feeding rolls with their axes in different planes for feeding ears of corn, each of said axes similarly positioned with reference to the longitudinal axis of said ears and non-parallel with each other.

18. In a corn cutting machine, a plurality of skewed rolls adapted to engage the surface of ears of corn in a transverse plane, said rolls positioned to definitely guide the ears of corn, and means for rotating said rolls to rotate and longitudinally feed said ears.

19. In a corn cutting machine, a plurality of skewed rolls for feeding ears of corn, means for varying the skew of said rolls, and means for rotating said rolls to rotate and longitudinally feed said ears.

20. In a corn cutting machine, a plurality of rolls for feeding ears of corn of varying size by contact therewith, means for cutting the corn from said ears in a spiral path, said means constructed to operate with a definite pitch of said spiral, means for rotating said rolls to rotate and longitudinally feed said ears, and means for varying the angle of contact of said rolls with the ears to feed the ears in a spiral corresponding to the pitch of said cutting spiral.

21. In a corn cutting machine, a plurality of rolls for feeding ears of corn of varying size by contact therewith, means for cutting the corn from said ears in a spiral path, said means constructed to operate with a varying angle of said spiral on varying sized ears, means for rotating said rolls to rotate and longitudinally feed said ears, and means for varying the angle of contact of said rolls with the varying sized ears to feed the ears in a spiral whose angle corresponds to the angle of the said spiral cut.

22. A corn cutting machine comprising, skewed rolls contacting with the surfaces of ears of corn of varying size to rotate and longitudinally feed them, knives contacting with said ears and operative in a spiral path of a definite width, and means for varying the skew of said rolls to maintain a longitudinal feed corresponding to the width of said spiral path of the knives.

23. A machine for feeding units of circular cross-section comprising, a plurality of rolls for feeding units of varying size, means for rotating said rolls to rotate and longitudinally feed said units, and means for varying the skew of said rolls to maintain the longitudinal feed during each rotation of varying sized units.

In testimony whereof I hereby affix my signature in presence of two witnesses.

WILLIAM B. FENN.

Witnesses:
 ETHEL HAMBLETON,
 J. C. NAILOR.